Sept. 16, 1958  R. W. DRURY  2,851,921
DEVICE FOR OBSERVING REFRACTIVE INDEX VARIATIONS
Filed Sept. 13, 1955  2 Sheets-Sheet 1
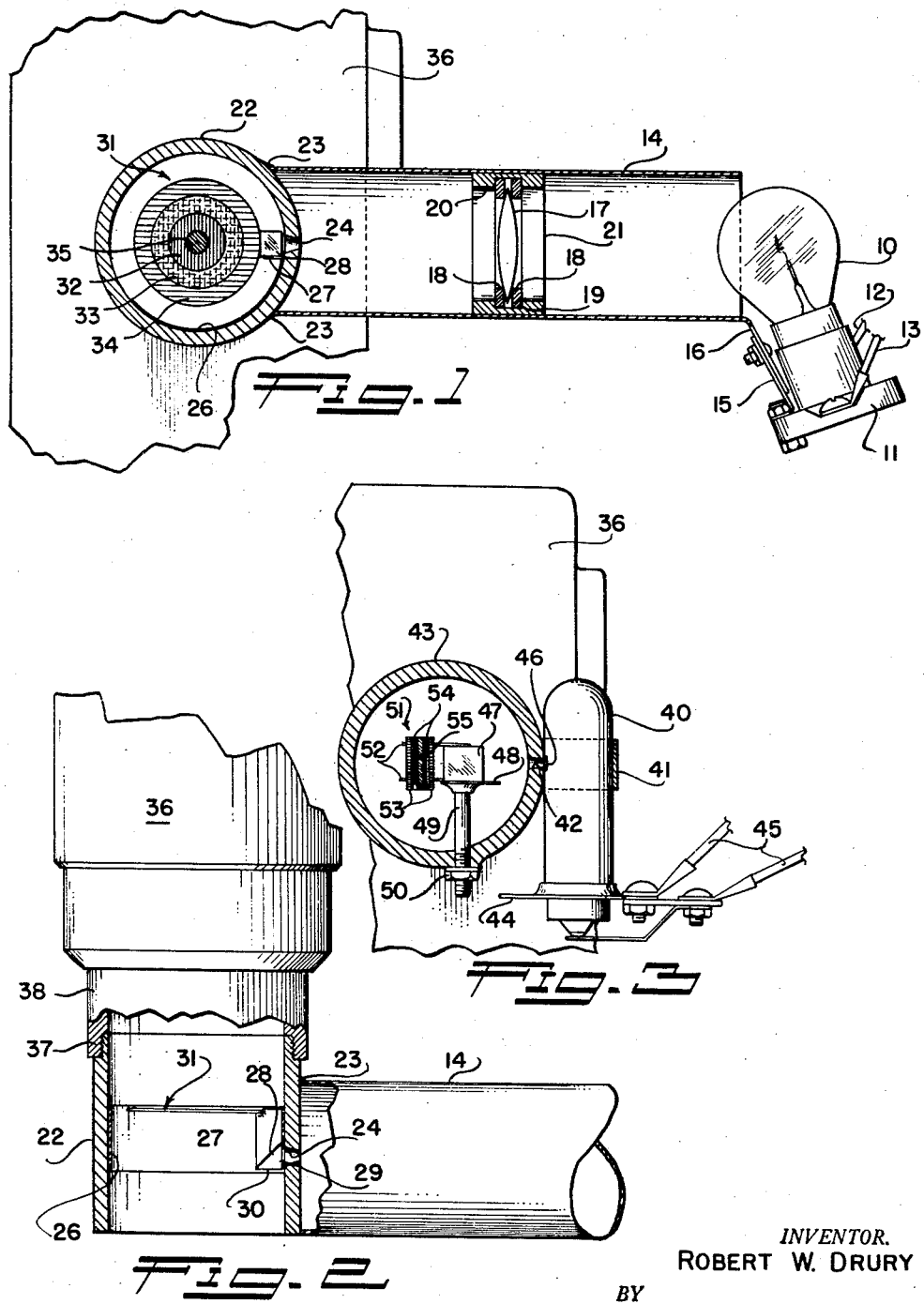
INVENTOR.
ROBERT W. DRURY
BY
George C. Sullivan
Agent

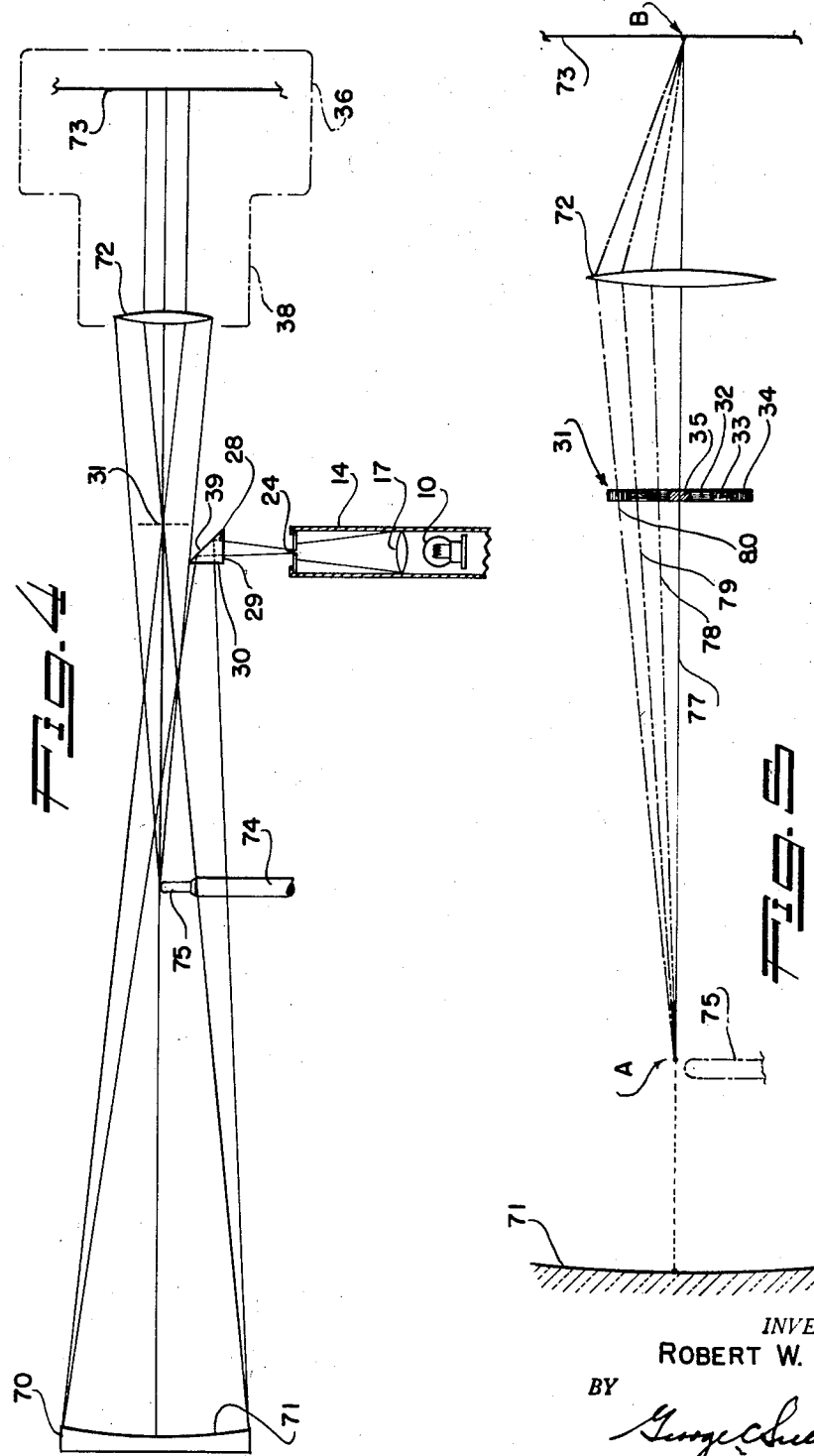

United States Patent Office 2,851,921
Patented Sept. 16, 1958

2,851,921

DEVICE FOR OBSERVING REFRACTIVE INDEX VARIATIONS

Robert W. Drury, San Fernando, Calif., assignor to Lockheed Aircraft Corporation, Burbank, Calif.

Application September 13, 1955, Serial No. 533,971

3 Claims. (Cl. 88—14)

This invention relates to data processing systems and more particularly to a device for sampling and recording light deviations caused by variations in refractive index of a transparent medium.

In the past, a schlieren method has been used for rendering visible either colorless fluids, which have a different refractive index on their surrounding medium, or variations in the refractive index for thickness of solids. The schlieren method employs a simple optical device to render visible, either in a telescope or on a screen or by photography, small changes of refractive index in the air or in other optical media. Changes in refractive index may be brought about by changes in pressure or in temperature, so that the method may be employed to render visible compression waves from sound or rapidly moving projectiles, convection streams, air movements, vortex rings formed in warm air, or vapors of different density. Various optical systems have been employed for producing the schlieren effect. The general principle employed by these optical systems is usually the same in all cases, and it consists of the employment of some optical element, either a lens or mirror, to produce an accurate image of a sharp-edged stop illuminated by a condensing system. Another similar stop is arranged to coincide with the image formed in such a way that nearly all the light is cut off, and such light as passes the second aperture transverses a lens system by which an image of the main lens or mirror is formed on a screen or for observation with an eyepiece. Any variation of refractive index in the air between the mirror or lens acting as a condensing element and the second stop will cause a slight deviation of the rays forming the image so that light traversing the region of altered refractive index will either be completely intercepted by the second stop or will pass it with more margin than usual. The image on the screen will show such areas of altered refractive index as respectively darker or lighter than the background.

For recording schlieren effects the photographic method is most generally used. However, it is difficult to obtain useful information since the effects due to convection air currents are constantly changing, and while an observer watching them on the screen can often discern a general tendency it is very difficult to photograph at the precise moment when the airstream is in a really representative position. Furthermore, the effects seen are often characterized more by the motion and the relative speeds of motion in different parts of the field. One method of recording a picture is to project the image to a fairly large scale on a drawing bench and to sketch the airstreams in pencil. Another method of recording is generally referred to as the vapor screen method for air flow visualization, which permits qualitative study of vortices generated in the air by the means of creating a fog in the airstream and illuminating the cross section of the stream with light through a narrow slit. It is possible to see and photograph the vortices as dark spirals in a light plane. Another method of recording is known as "shadowgraph." This method requires the object under observation to be moved into still air at high speeds, for example Mach 2.8, past a camera station illuminated by a high intensity electric spark.

All of the above methods of presentation or recording are considered qualitative in nature since information gathered appears in black and white and shades between which are unmeasurable and the evaluation of results is limited to the experience and opinion of the observer. A need has existed for a device which would present this type of record in a quantitative manner.

In accordance with the present invention there is provided a means for quantitatively recording the variations of refractive index in gases, liquids and transparent solids. A plurality of ranges of variation is established corresponding to various colors so that light rays deflected by an area of air having a particular refractive index will pass through a transparent colored filter. Other light rays passing through air of less or greater refractive index will pass through other colored filters corresponding to other ranges. These variations in color may be recorded on film so that the observer may glance at the colored pictures and visualize the air turbulence and the amount thereof. The amount may be measured in any suitable form of measurement such as temperature or pressure. This factor is dependent upon the source of air disturbance such as heat, vibration, or movement of an object.

In one form of the present invention for measuring heat, there is provided a light source directed to transmit light rays to a light condensing means. The light rays are converged past an object under test by the condensing means and passed through a filter of one color. The object under test causes atmospheric disturbance under some conditions, such as heating or moving, and thereby alters the refractive index so that the paths of light rays passing in close proximity to the object are deflected or refracted from their normal path to travel through a second filter of another color. Third and fourth colored filters are employed to pass light rays associated with third and fourth degree of refractive index alteration in particular areas. A recording means is employed to register the image as colored by the filters.

It is an object of the present invention to provide a novel means of measuring the effects made visible in a schlieren system of investigation.

It is another object of the present invention to provide a means for obtaining quantitative results employing the schlieren method rather than qualitative results.

It is still another object of the present invention to record a plurality of colors representing the variations in density of turbulent air surrounding an object as described above.

It is a further object of the present invention to provide a means for producing effects or data obtained by employment of a schlieren system represented by a plurality of colors.

These and other objects may be seen with reference to the following description and drawings, in which:

Figure 1 is a front view in section showing a light source arrangement and a radially colored filter of a device in accordance with the present invention;

Figure 2 is a sectional plan view of the device of Figure 1 showing its arrangement in relation to the camera;

Figure 3 is a front view in section of another embodiment of the present invention employing perpendicular colored filters;

Figure 4 is a schematic drawing in accordance with the present invention showing the basic optical system employed for observing an object under test in a cool or non-vibratory atmosphere; and Figure 5 is a schematic drawing showing the deflection of a central light ray at four time intervals corresponding to four gradients of density caused by the temperature generated by the object under test.

In accordance with the present invention, an optical device is shown in Figures 1, 2 and 4 which employs a conventional electric lamp 10 as a light radiating source. The lamp is mounted on a base 11 which is provided to receive electrical leads 12 and 13 connected to any suitable electrical source (not shown). A hollow tube 14 is provided for isolating a portion of emitted light from the lamp. The base of the lamp is carried by the tube by means of a clip 15 suitably affixed to an extension 16 integral with the tube and angled to permit a portion of the lamp to be projected into the interior of the tube.

Equidistant from the ends of the tube, a collecting lens means 17 is provided for collecting and intensifying light rays emitted from the light source. The collecting lens means as shown is a double convex lens held inside the tube by a mounting arrangement comprising a pair of washers 18 disposed on each side of the lens means within a groove 19 defined by a pair of shoulders 20, forming ring 21. The mounting ring is suitably affixed to the inner surface of the tube.

The tube carries on its end opposite the light source a cylinder 22 suitably joined at right angles to provide a light-tight connection. The cylinder may be affixed to the tube by welds 23. A small aperture 24, connecting the interior of the tube with the interior of the cylinder, is aligned on the principal axis of the collecting lens means 17 and is provided for passing light rays emitted by the light source via the collecting lens means. A semi-circular ring 26 is internally mounted in the cylinder and is provided with a flange 27 for carrying a prism 28. This prism is a small right angle type prism and may be glued to the flange. The prism is aligned on the principal axis of the collecting lens means so that light passing through the aperture will be received through face 29 and re-directed perpendicular to this axis via face 30.

Flange 27 also carries a circular filter 31 composed of suitable transparent material such as plastic. The filter comprises a plurality of colored concentric rings, such as rings 32, 33 and 34 disposed around a center spot 35. The spot is shown colored green. For illustrative purposes, the rings are colored as follows: ring 32 red, ring 33 yellow, and ring 34 blue.

It should be noted that the means for observing the variation of refractive index may be a screen, a telescope-like instrument, or the naked eye. In the present instance, photographic recording is used which employs a camera 36. Any high speed camera may be employed.

The cylinder 22 may be machined to screw into threads 37 provided within the lens hood 38 of the camera. The camera should be aligned directly on the horizontal axis of the filter.

A second embodiment of the light source and filter arrangement is shown in Figure 3 in which an exciter lamp 40 is fastened by means of a clip 41 over a small aperture 42 drilled through the side of a cylinder 43. The cylinder is attachable to the lens hood 38 of camera 36 in the same manner as described for the embodiment of Figures 1 and 2. The lamp is provided with a base 44 for attaching electrical leads 45 which are connected to a suitable electrical source (not shown) either stationary or portable. It has been found that a lamp rated at .75 ampere at four volts is suitable for normal operation. By increasing the voltage to six volts sufficient light is made available to allow a camera to run at a speed of 3000 frames per second which presents a full exposure on high speed film of 1/15,000 of a second for each frame. Stray light introduced into the system from internal reflections in the lamp can be reduced considerably by painting the lamp flat black except for a small window 46 adjacent the aperture on the side of the cylinder. The amount of remaining stray light is negligible and is of a low enough level to be dropped out in any recorded result.

A prism 47, similar to the type employed in the embodiment of Figure 1, is located interiorly of cylinder 43 and is glued to a plate 48 carried by a pedestal 49 inside the cylinder in alignment with aperture 42. The pedestal extends through the cylinder and is fastened thereto by means of a nut and thread arrangement 50. The plate carries, in addition to the prism, a filter 51 supported by a pair of extensions 52 glued to the top of the prism and the plate respectively. The filter comprises a plurality of colored transparent strips glued to the pair of extensions within the interior of the cylinder perpendicular to longitudinal axis of aperture 42. Strips of like-colors 53 and 54 are arranged about a single colored strip 55. The single colored strip functions in the same manner as the spot employed in the device of Figure 1 which will be described later. As illustrated, the strips are colored as follows: strips 53 blue, strips 54 red, strip 55 green. A filter arranged in this manner records air disturbance along the horizontal plane of the filter and not radially as the filter of Figure 1.

In the schematic drawing of Figure 4, light rays are shown transmitted from light source 10 similar to the embodiment of Figure 1. The light rays are collected and intensified by passing through lens 17. Some intensified light rays travel through small aperture 24 which directs the light rays to small right angle prism 28. Rays entering the short face 29 of the prism perpendicularly strike the back face 39 at a 45° angle and are totally reflected to emerge from face 30. The light rays diverge as they leave the prism. A light condensing means (concave focusing means) is provided for re-directing the light rays and causing them to converge.

In the present instance, the condensing means is mirror 70 having a concave surface 71 approximately 10 inches in diameter with a focal length of 82½ inches. This results in a focal ratio of approximately $f.8$ and provides a working distance from the mirror to a camera lens 72 of about 13 feet 8 inches or twice the focal length. These dimensions are not critical during construction but the approximate working distance required to observe an object is generally determined before starting. Since the distance between the prism and mirror is about 7 feet, a small bundle of rays commonly referred to as a beam is sensibly parallel. With such parallel beams the fundamental principles of optics can be established.

The filter 31 is located on the focal plane of the condensing means so that the focal point appears on the center spot 35 of the filter. Rays emerging from the filter are diverging outward in direction and are shown entering conventional camera lens 72 of the type which transmits each ray to a particular spot on a film sheet 73 regardless of the angle which the ray enters the lens.

In order to illustrate the effects of the invention an object, such as a soldering iron 74, is employed which may be heated from a suitable electrical source (not shown). As the tip becomes heated, the temperature surrounding the tip varies the density of the atmosphere. Great temperature differences are formed in the turbulent air by corridors of cool air surrounding areas of heated air. A soldering iron tip 75 is extended into the converging light ray area traveling from concave surface 71 of the condensing means. The camera lens is focused on the object and the position of the object may be referred to as the plane of observation.

Employing the above optical arrangement and assuming that the object is cold so that no atmospheric disturbance is present in the vicinity or proximity of soldering iron tip, a dark silhouette of the tip will appear on the film against a solid green background. This is accomplished since all the light rays are passed through the green center spot except those rays which are blocked by the tip. With the introduction of air disturbance, any density variations in the vicinity of the object cause refraction or bending of the passing light rays. The rays that are bent upward miss the periphery of the filter entirely and cause correspondingly brightened areas on the film.

The schematic illustrated in Figure 5 shows the central light ray emerging from the concave surface of the condensing means and its path dependent upon the atmospheric density at a point A during four time periods. Each time period represents the ray deflection for a given index of refraction. During the first time period, represented by numeral 77, the atmosphere in the proximity of point A is undisturbed and thereby the light ray is not deflected and continues to travel along the principal axis of the condensing means to record at a point B on the film 73, the color of the filter ring through which it passed. As heat generated by the soldering iron tip 75 causes the surrounding atmosphere to compress and expand, the index of refraction at point A will be effected in accordance therewith. A particular variation of refractive index may occur during the second time period, represented by numeral 78, which will cause the central light ray to be deflected through another colored ring in the filter which will be recorded on film at point B. Different temperatures affecting atmosphere density at point A is further represented by the deflection of the central ray during a third and fourth period represented by numerals 79 and 80. Various ranges of temperature may be assigned to each color so that the presence of a particular color will indicate the range of temperature in the atmosphere in an area surrounding the soldering iron tip.

Thus, it can be seen that the variations of refractive index occurring in a medium through which a light ray passes will deflect the light ray through a multi-colored filter associated with the amount of variation. By focusing a camera on the object and spacing the multi-colored filter between the object and the camera, a multi-colored image is obtained which may be recorded on film.

Having described only typical forms of the invention I do not wish to be limited to the specific details herein set forth, but wish to reserve to myself any variations or modifications that may appear to those skilled in the art and fall within the scope of the following claims.

I claim:

1. An instrument for observing refractive index variations occurring in a transparent medium comprising the combination of, a light source, a housing enclosing the light source, a cylinder fastened on one end of the housing, an aperture connecting the housing with the interior of the cylinder, a right angle prism within the cylinder in alignment with the aperture, a concave focusing means for receiving light transmitted from the light source via the prism, a transparent filter located on the focal plane of the concave focusing means, the filter comprising a plurality of colored concentric regions disposed about a colored center region on the principal axis of the concave focusing means, and the light source being focused on the filter via the concave focusing means whereby changes in refractive index in the medium between the concave focusing means and the filter result in shifting of the image on the filter from one region to another region thereon.

2. An instrument for observing refractive index variations occurring in a transparent medium comprising the combination of, a light source, a holder supporting the light source, a cylinder fastened to the holder, an aperture communicating the interior of the cylinder with the light source, a right angle prism within the cylinder in alignment with the aperture, a concave focusing means for receiving light transmitted from the light source via the prism, a transparent filter located on the focal plane of the concave focusing means, the filter comprising a plurality of colored regions disposed about a colored central region on the principal axis of the concave focusing means, and the light source being focused on the filter via the concave focusing means whereby changes in refractive index in the medium between the concave focusing means and the filter result in shifting of the image on the filter from one region to another region thereon.

3. An instrument for observing refractive index variations occurring in a transparent medium comprising the combination of, a light source, a holder for the light source, a prism carried by the holder, a filter secured to the holder adjacent the prism, a concave focusing means for receiving light transmitted from the light source via the prism, a transparent filter located on the focal plane of the concave focusing means, the filter comprising a plurality of colored regions disposed about a colored central region on the principal axis of the concave focusing means, and the light source being focused on the filter via the concave focusing means whereby changes in refractive index in the medium between the concave focusing means and the filter result in shifting of the image on the filter from one region to another region thereon.

References Cited in the file of this patent

FOREIGN PATENTS 842,856    Germany _____ July 3, 1952

OTHER REFERENCES

Darsow: "Photographic Techniques as Applied to the Study of High-Speed Flow," in Photographic Science and Technique, Ser. II, vol. 2, pages 97–100, May 1955.